United States Patent
Kutchey et al.

(10) Patent No.: US 7,568,724 B2
(45) Date of Patent: Aug. 4, 2009

(54) AIRBAG COVER WITH RETAINING CHANNEL

(75) Inventors: Michael B. Kutchey, Macomb, MI (US); Steven C. Glefke, Macomb, MI (US); Darcy Malavolti, Warren, MI (US); Noah G. Vogeli, East Pointe, MI (US)

(73) Assignee: Autoliv ASP, Inc., Ogden, UT (US)

( * ) Notice: Subject to any disclaimer, the term of this patent is extended or adjusted under 35 U.S.C. 154(b) by 357 days.

(21) Appl. No.: 11/525,714

(22) Filed: Sep. 22, 2006

(65) Prior Publication Data

US 2008/0073884 A1 Mar. 27, 2008

(51) Int. Cl.
*B60R 21/215* (2006.01)
(52) U.S. Cl. .................................. 280/728.3
(58) Field of Classification Search ............. 280/728.2, 280/728.3, 732
See application file for complete search history.

(56) References Cited

U.S. PATENT DOCUMENTS

| | | | | |
|---|---|---|---|---|
| 5,482,313 A | | 1/1996 | Ikeya et al. ............. 280/728.2 |
| 6,161,862 A | * | 12/2000 | Rose et al. ............... 280/728.2 |
| 6,161,865 A | * | 12/2000 | Rose et al. ............... 280/728.3 |
| 6,296,270 B1 | * | 10/2001 | Amamori ................. 280/728.2 |
| 6,557,886 B1 | * | 5/2003 | Sakaguchi ............... 280/728.2 |
| 7,048,297 B2 | * | 5/2006 | Schneider ................ 280/728.2 |
| 2003/0067143 A1 | | 4/2003 | Nelson et al. ............ 280/728.2 |

FOREIGN PATENT DOCUMENTS

GB 2 328 646 4/1997

* cited by examiner

*Primary Examiner*—Paul N. Dickson
*Assistant Examiner*—Robert A. Coker
(74) *Attorney, Agent, or Firm*—Sally J. Brown; Stoel Rives LLP

(57) ABSTRACT

An airbag module including a module housing and cover is disclosed. The cover may include a molded-in channel to engage a flange extending from the module housing. The interaction between the channel and flange permit limited movement of the cover with respect to the module housing. The airbag module may further include hook and window engagement mechanisms as well as locking tab and window engagement mechanisms to couple the cover to the housing.

18 Claims, 6 Drawing Sheets

AIRBAG COVER WITH RETAINING CHANNEL

TECHNICAL FIELD

The present disclosure relates generally to the field of automotive protective systems. More specifically, the present disclosure relates to airbag covers and related components for airbag modules.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

DETAILED DESCRIPTION

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other.

Inflatable airbag systems are widely used to minimize occupant injury in a collision scenario. Airbag modules have been installed at various locations within a vehicle, including, but not limited to, the steering wheel, the instrument panel, within the side doors or side of seats, adjacent the roof rail of the vehicle, in an overhead position, or at the knee or leg position.

Figure 1:
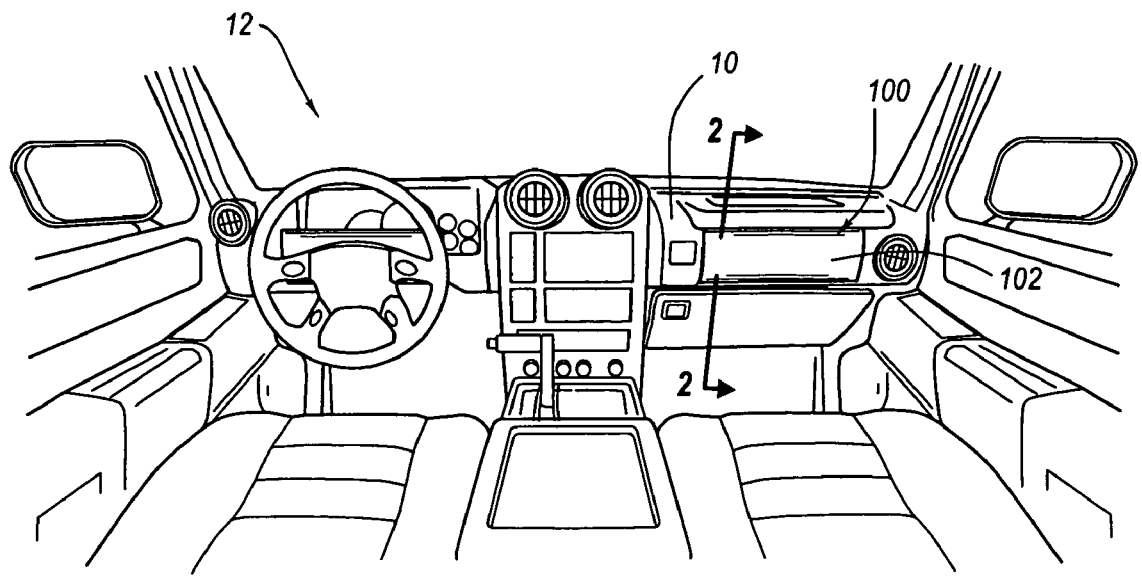
FIG. 1 is a perspective view of the interior of a vehicle showing one embodiment of a cover for an airbag module positioned in the instrument panel.

FIG. 1 represents one embodiment of an inflatable airbag module 100 positioned within an instrument panel 10 of a vehicle 12, as shown from a perspective view within the vehicle 12. From inside the cabin of the vehicle, a cover 102 of the airbag module 100 is visible. Airbag systems may be modular in nature and often include airbag cushions, optionally constructed of a fabric material, airbag covers 102, and reaction housings. The term "housing" is used broadly herein to encompass housings that may enclose a portion of or all of an airbag and/or inflator. The term "housing" may also encompass a reaction surface or plate that does not necessarily enclose the airbag.

A reaction housing and an airbag cover 102 typically mate or interlock to form an airbag storage volume. The airbag storage volume may be defined as the volume between the interlocked reaction housing and airbag cover 102. The airbag may be placed in a folded or rolled state, or a combination thereof, within the airbag storage volume. The airbag will generally have an inflation opening where the airbag attaches to the reaction housing and the airbag is then positioned within the reaction housing to deploy toward the airbag cover 102. The airbag cover 102 may include a front cover portion or panel that is exposed to the automobile cabin and a skirt or side walls that extend from the back surface or sides of the front panel.

The airbag cover 102 may be designed to release the airbag into the automobile cabin during inflation and deployment. The airbag cover 102 may release the airbag from the storage volume and into the passenger compartment by using hinged or pivotal doors or by tear-lines in the front panel of the cover 102 that tear apart when the airbag deploys.

To facilitate deployment of an airbag through the airbag cover 102 and into the automobile cabin, airbag modules typically use the different relative strengths between the reaction housings and the airbag cover 102. Because the pivotal door or the tear lines in the airbag cover 102 are often designed to yield when an airbag deploys, the relative strength of the airbag cover 102 is usually smaller than the strength of the reaction housing. Consequently, when an airbag expands, the reaction housing acts as a reaction surface from which the expanding airbag may exert an equal and opposite load on the airbag cover 102. The airbag cover 102 yields to the expanding airbag, allowing the inflated airbag to deploy away from the reaction housing and into the automobile cabin.

Figure 2:
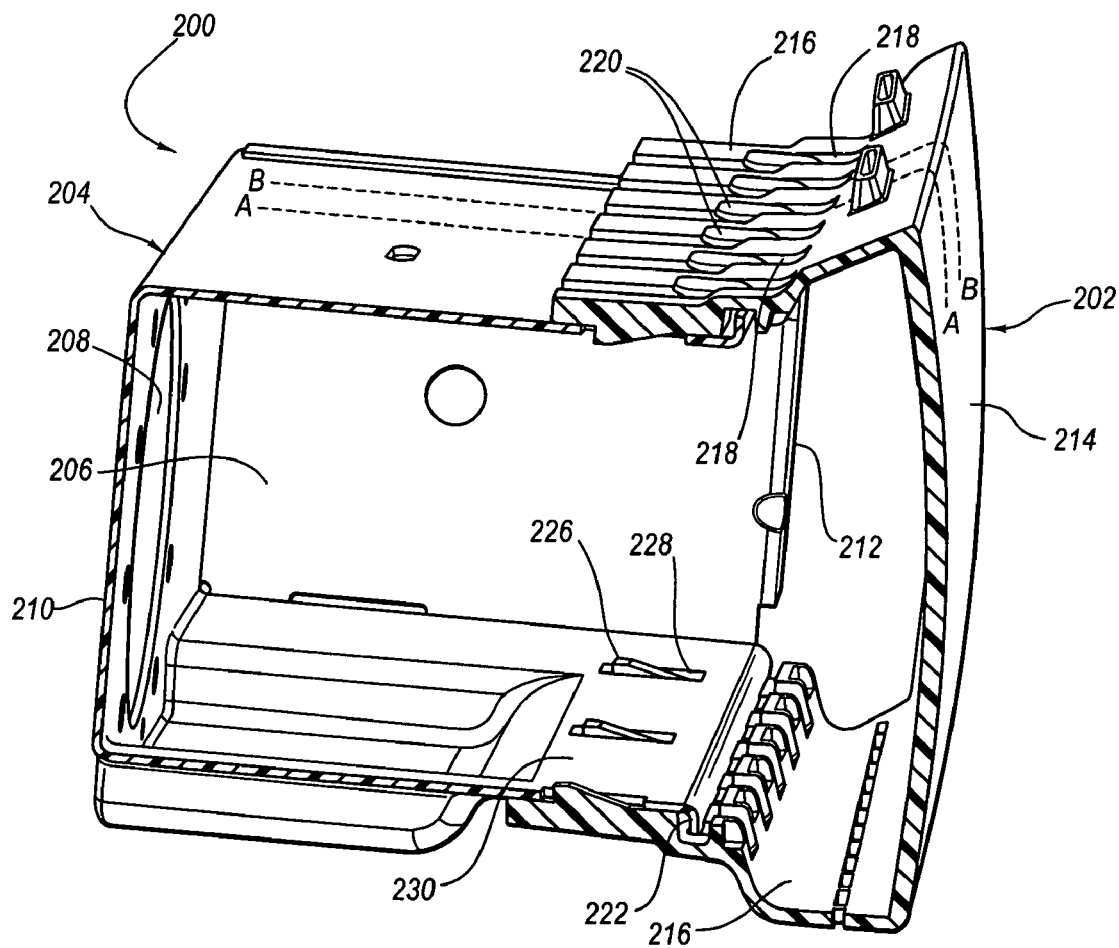
FIG. 2 is a cross sectional perspective view of one embodiment of an airbag cover coupled to an airbag module housing.

FIG. 2 represents one embodiment of an airbag module 200 from a cross sectional perspective view. The airbag module 200 may include a cover 202 and a reaction housing 204. The cavity defined by the module housing 204 and the airbag cover 202 form an airbag storage volume 206 into which an airbag (not shown) may be stored, optionally with an inflator (not shown). The module housing 204 may include an inflator-receiving window 208 in the base 210 or bottom portion of the housing module 204. An inflator may be secured in communication with an airbag disposed in the airbag storage volume 206 through the inflator-receiving window 208.

The module housing 204 may be disposed within a cavity in the instrument panel of a vehicle, such that the cover 202 is the only component of the airbag module 200 that is exposed to the vehicle cabin as depicted in FIG. 1. Alternatively, the module housing may be disposed within the steering wheel or side door of the vehicle as would be apparent to those having skill in the art with the aid of the present disclosure. Furthermore, the module housing 204 may be disposed at an alternative location within the instrument panel for knee airbag modules and similar systems.

In the embodiment depicted, the airbag module cover 202 is coupled to the module housing 204 at or near the top edge 212 of the module housing 204. The airbag cover 202 has a top cover portion 214 that covers the airbag storage volume 206 and airbag. The top cover portion 214 is typically the portion of the cover 202 that is exposed in the vehicle cabin compartment. Extending from the sides or underneath the top cover portion 214 of the cover 202 are side walls 216, or the skirt of the cover 202.

Within the side walls 216 of the cover 202 are a number of openings 218 that are spaced to receive correspondingly spaced hooks 220 that extend from the module housing 204. In some embodiments, a simple protrusion, such as a tab, may be used to engage the openings 218 of the cover 202. In yet other alternative embodiments, the hooks or protrusions may extend from inside the cover side walls 216 and engage corresponding openings in the module housing 204.

In the embodiment depicted in FIG. 2, a flange 222 or series of flanges 222 extend away from a center portion of the housing 204 (i.e., the central axis of the housing 204) and are received by a channel 224 disposed on an interior side of the cover side walls 216. The flange 222 may be considered a singular flange because it extends across the top edge 212 of the module housing 204. Since hooks 220 also extend from the top edge 212 of the housing 204, the flange 222 may be considered a plurality of flanges 222 because each flange component may be adjacent a hook 220 or protrusion. The relationship between the channel 224 in the cover 202 and the flanges 222 will be discussed in greater detail in conjunction with the description accompanying FIGS. 3A to 6B.

The cover 202 may also further include locking tabs 226 which extend from the interior of the side walls 216 of the cover 202, and engage the module housing 204 through corresponding windows 228 in the housing side walls 230. The locking tabs 226 restrict movement of the cover 202 toward the base 210 of the module housing 204. In alternative embodiments, the locking tabs 226 may extend from the module housing 204 and engage corresponding openings in the cover side walls 216. The functionality of the locking tabs 226 and the corresponding windows 228 in the housing 204 will be discussed in greater detail in conjunction with the description accompanying FIG. 7. In yet other alternative embodiments, the forward edge of the cover channel 224 may abut the housing side wall 230 to provide a limiting factor in compression movement.

Figure 3A:
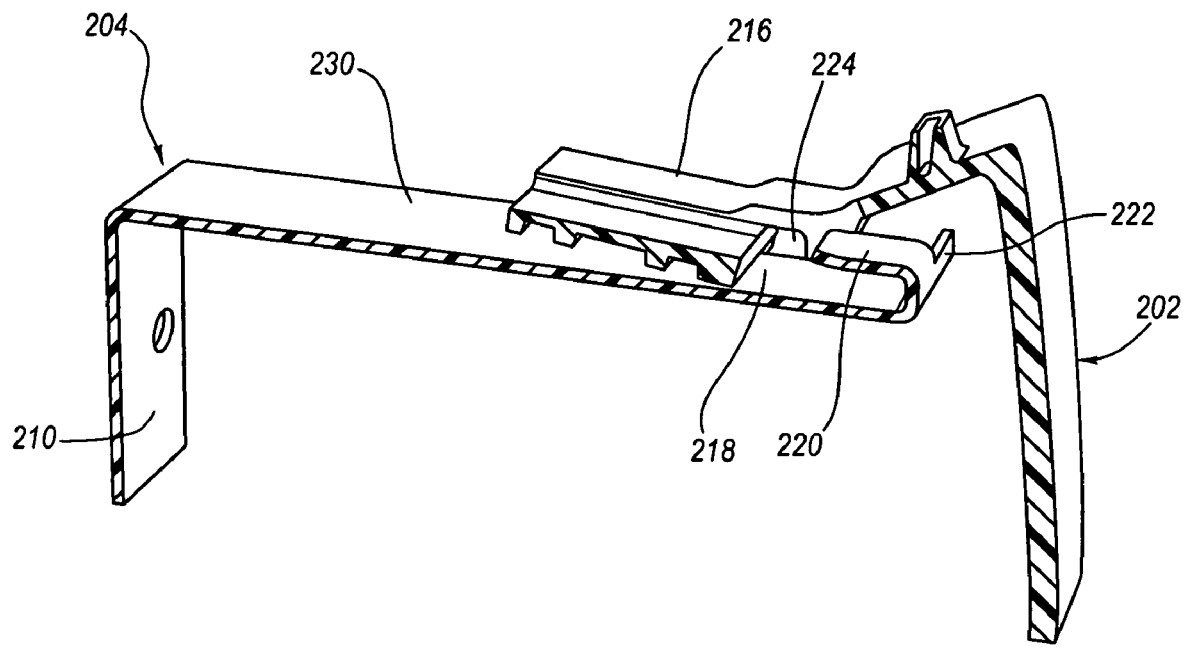
FIG. 3A is partially cut-away cross sectional perspective view of the airbag cover of FIG. 2 shown between plane A-A and plane B-B before the airbag cover is engaged with the airbag module housing.
Figure 3B:
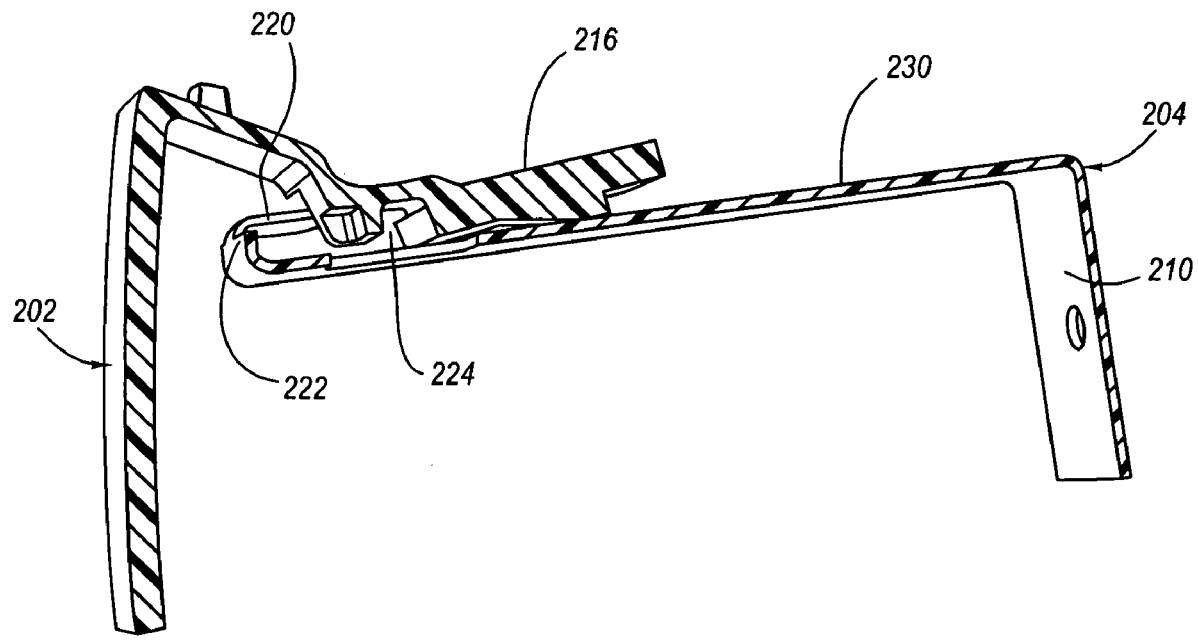
FIG. 3B is a partially cut-away cross sectional alternative perspective view of the airbag cover and housing of FIG. 3A before the airbag cover is engaged with the module housing.

FIGS. 3A and 3B represent a portion of the airbag cover 202 and module housing 204 between planes A-A and B-B of FIG. 2, from two alternative partially cut-away cross sectional perspective views. The module housing 204 and cover 202 are depicted before being engaged with one another. The module housing 204 includes a hook 220 to be received by a corresponding opening 218 or window in the side wall 216 of the cover 202. The channel 224 in the cover 202 and the corresponding housing flange 222 are also depicted.

In the embodiment depicted, when coupling the cover 202 to the module housing 204, a portion of the cover side wall 216 is moved toward the base 210 of the module housing 204, past the hook 220 so that the opening 218 of the cover 202 may be positioned to engage the hook 220. In some embodiments, the side wall 216 of the cover 202 is placed on the exterior of the side walls 230 of the housing 204.

Figure 4A:
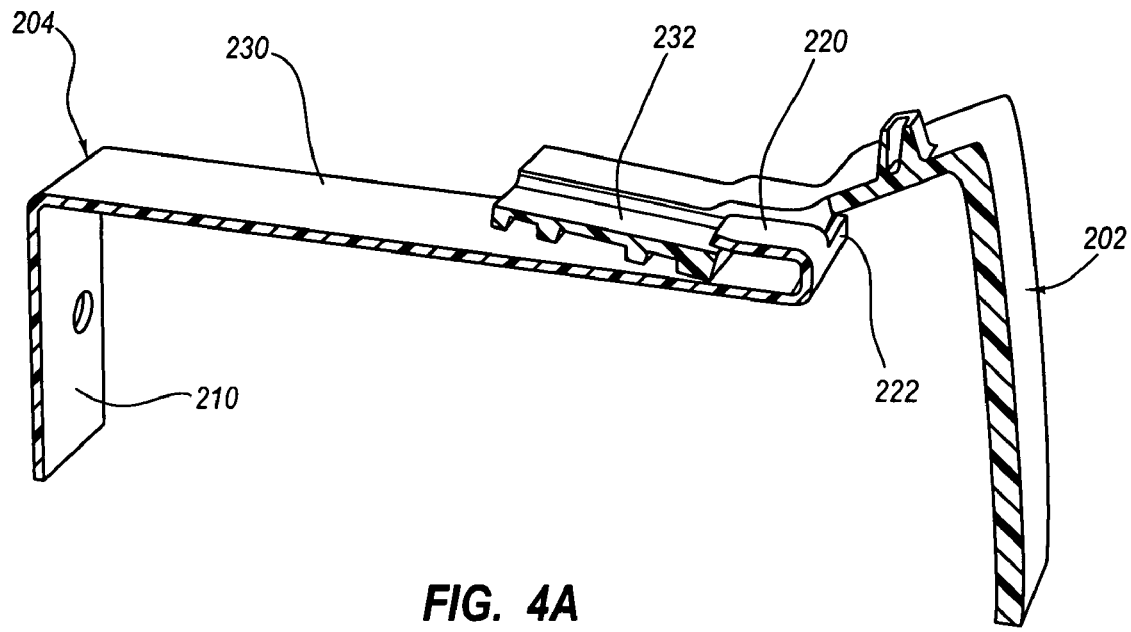
FIG. 4A is a partially cut-away cross sectional perspective view of the airbag cover of FIG. 2 shown between plane A-A and plane B-B as the airbag cover is beginning to be engaged with the airbag module housing.
Figure 4B:
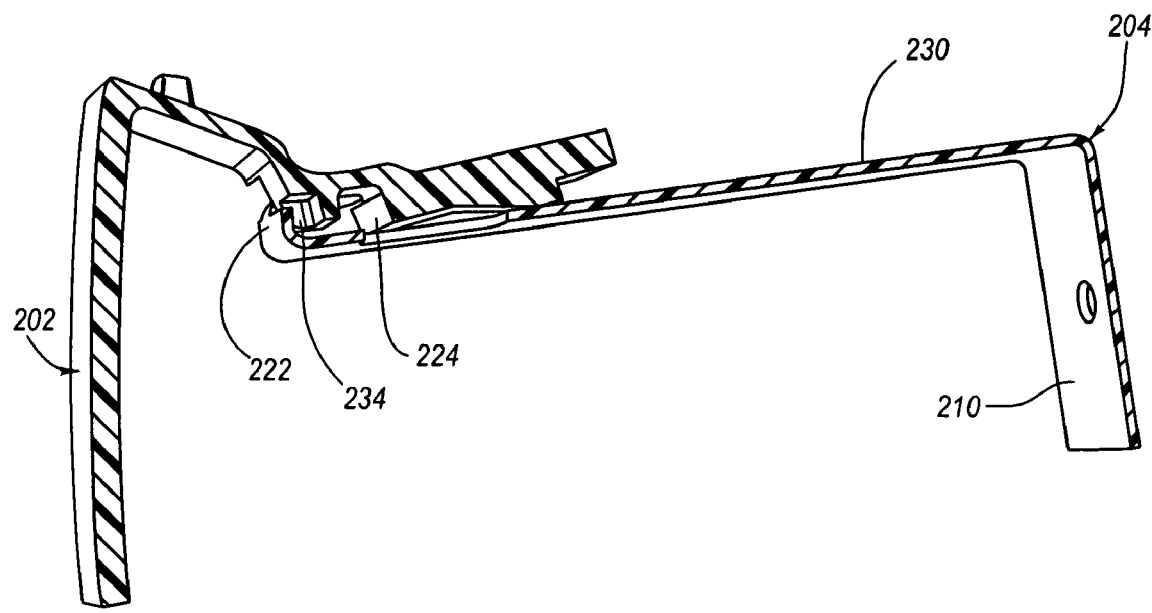
FIG. 4B is a partially cut-away cross sectional alternative perspective view of the airbag cover and housing of FIG. 4A.

FIGS. 4A and 4B represent a portion of the airbag cover 202 and module housing 204 between planes A-A and B-B of FIG. 2, from two alternative partially cut-away cross sectional perspective views. Compared to their respective positions depicted in FIGS. 3A and 3B, the cover 202 has been moved away from the base 210 of the housing 204. The hook 220 extending from the side wall 230 of the module housing 204 is beginning to engage the corresponding opening (obscured by hook 220). The portion of the hook 220 that runs parallel to the side wall 230 may slide over a depression 232 on the exterior of the cover side wall 216.

At this position, the flange 222 extending from the housing 204 of this exemplary embodiment, is abutting a ramped heel 234 on the interior of the cover 202. The ramped heel 234 may be adjacent the molded-in channel 224 that is configured to receive the housing flange 222 when a sufficient force causes the ramped heel 234 to pass over the flange 222.

Figure 5A:
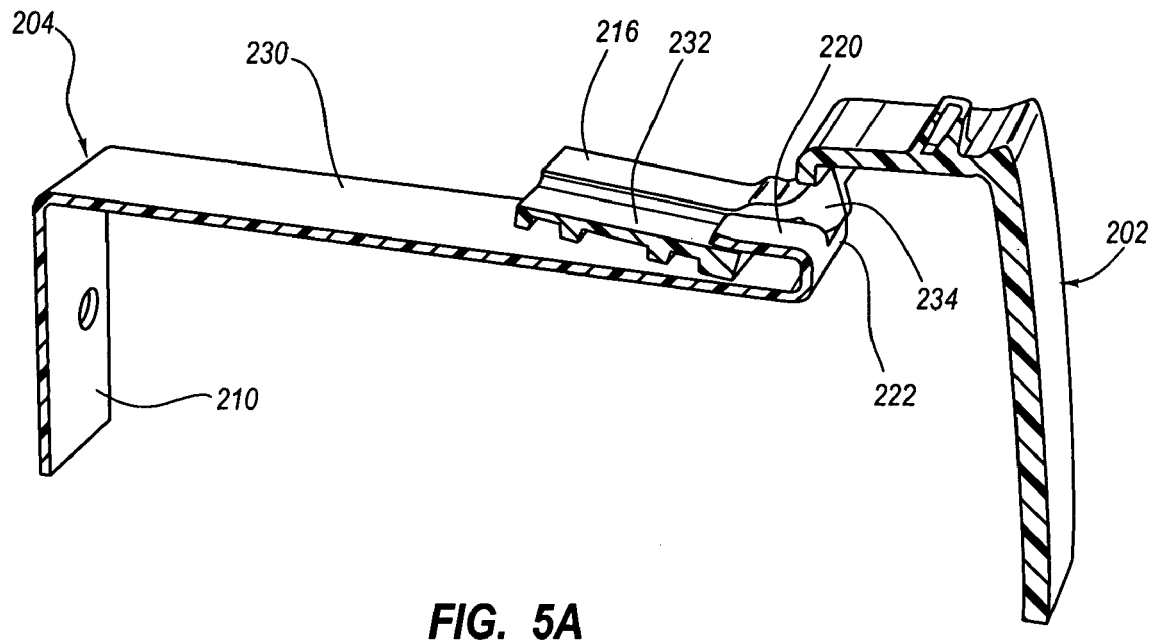
FIG. 5A is a partially cut-away cross sectional perspective view of the airbag cover of FIG. 2 shown between plane A-A and plane B-B as the airbag cover is being deflected into engagement with the airbag module housing.
Figure 5B:
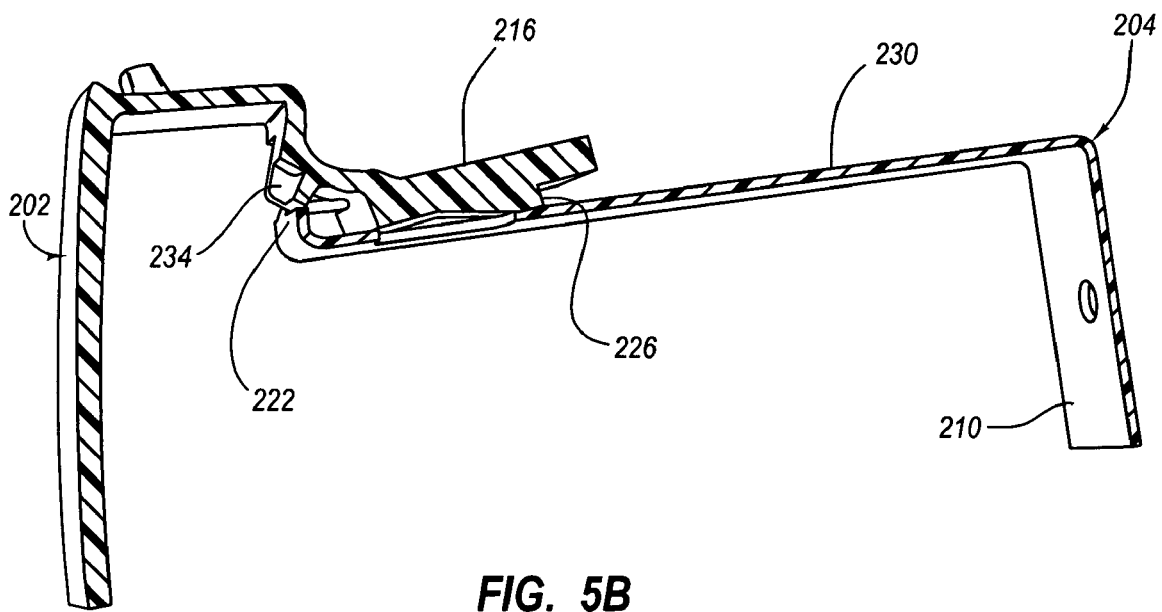
FIG. 5B is a partially cut-away cross sectional alternative perspective view of the airbag cover and housing of FIG. 5A.

FIGS. 5A and 5B represent a portion of the airbag cover 202 and module housing 204 between planes A-A and B-B of FIG. 2, from two alternative partially cut-away cross sectional perspective views. As the cover 202 is pulled away from the base 210 of the housing 204, the ramped heel 234 of the cover 202 is deflected outward, away from the central axis of the housing 204 by the outwardly-extending flange 222. In some embodiments, the cover 202 is constructed of a plastic or composite material that can flex under some pressure without tearing or sustaining structural damage.

In the position depicted in FIGS. 5A and 5B, the hook 220 of the module housing 204 slides along depression 232 on the exterior of the cover side wall 216. The ramped locking tab 226 also pushes against the side wall 230 of the housing 204 when the cover 202 is pulled away from the base 210 of the housing 204. This causes the end of the cover side wall 216 to be pushed outward, away from the housing side wall 230. Consequently, according to the exemplary embodiment depicted, the flexible cover 202 is being pushed away from the module housing 204 at the ramped heel 234 and the ramped locking tab 226, simultaneously.

Figure 6A:
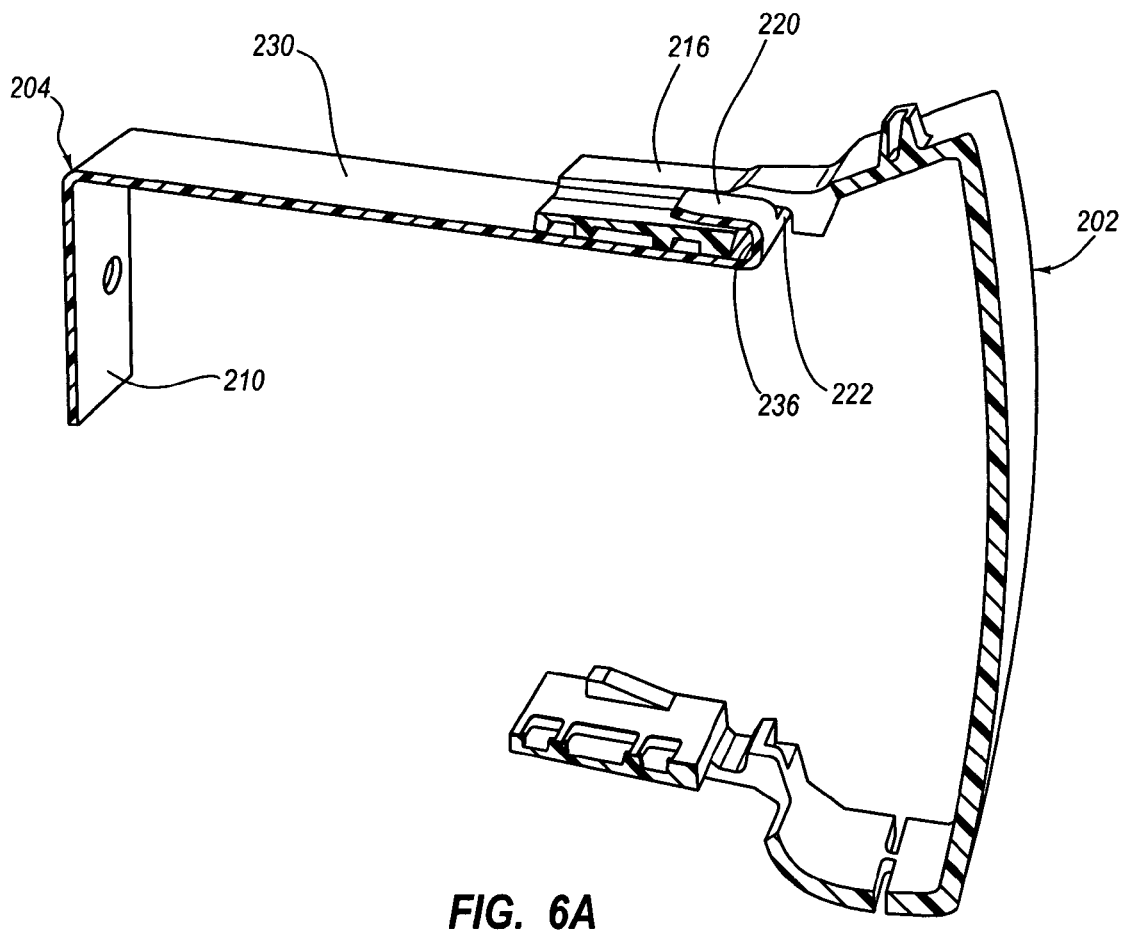
FIG. 6A is a partially cut-away cross sectional perspective view of the airbag cover of FIG. 2 shown between plane A-A and plane B-B once the airbag cover is engaged with the airbag module housing.
Figure 6B:
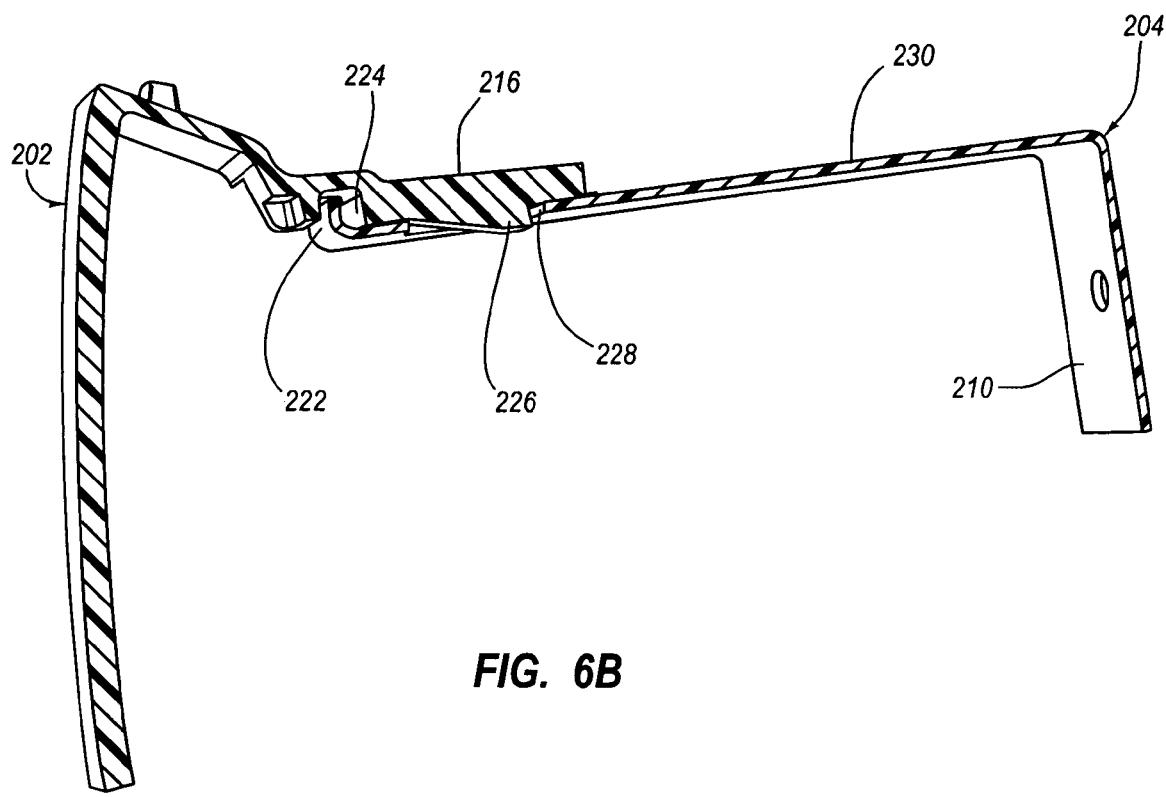
FIG. 6B is a partially cut-away cross sectional alternative perspective view of the airbag cover and housing of FIG. 6A.

FIGS. 6A and 6B represent a portion of the airbag cover 202 engaged with the module housing 204 between planes A-A and B-B of FIG. 2, from two alternative partially cut-away cross sectional perspective views. In the engaged position, the hook 220 of the housing 204 protrudes through the opening in the side wall 216 of the cover 202. When the cover 202 is pulled away from the base 210 of the housing 204, the side wall 216 engages a curved portion 236 of the hook 220 to inhibit or prevent separation of the cover 202 from engagement with the housing 204.

The locking tab 226 extending from the interior of the side wall 216 of the cover 202 engages a corresponding window 228 in the side wall 230 of the housing 204 to prevent compression movement of the cover 202 toward the base 210 of the housing 204. This may be accomplished through the interaction of the non-ramped end of the locking tab 226 abutting the housing side wall 230.

Once engaged, the housing flange 222 is disposed within the molded-in channel 224 in the airbag cover 202. According to one embodiment, the channel 224 has a width greater than the width of the flange 222. Because of the differences in width, the flange 222 is able to move a limited amount within the channel 224. This movement, defined by the channel 224 width, allows the cover 202 to move or float toward and away from the base 210 of the housing 204 a limited or defined distance.

The float permitted by the channel 224 allows the cover 202 to fit to surrounding components, such as the instrument panel surface, that may be susceptible to build-variation (nominal shift), without requiring the entire airbag module housing 204 to shift along with the cover 202. Furthermore, this concept isolates the influence of module build variation from the cover 202, and provides a more precise fit of the cover 202 to the environment. The float permitted by the channel 224 width allows the cover 202 to independently fit itself to the instrument panel, or other mounting location, without a stack-up of tolerances from the rest of the airbag module components.

According to the embodiment depicted in FIGS. 6A and 6B, the maximum amount the cover 202 may float is defined by the width of the channel 224 and the width of the module housing flange 222. In this embodiment, the cover 202 remains coupled to the housing 204 throughout the range it is able to float. Namely, the cover 202 remains engaged underneath the hook 220 and the locking tab 226 remains engaged within its corresponding window 228 over the floating distance.

Figure 7:
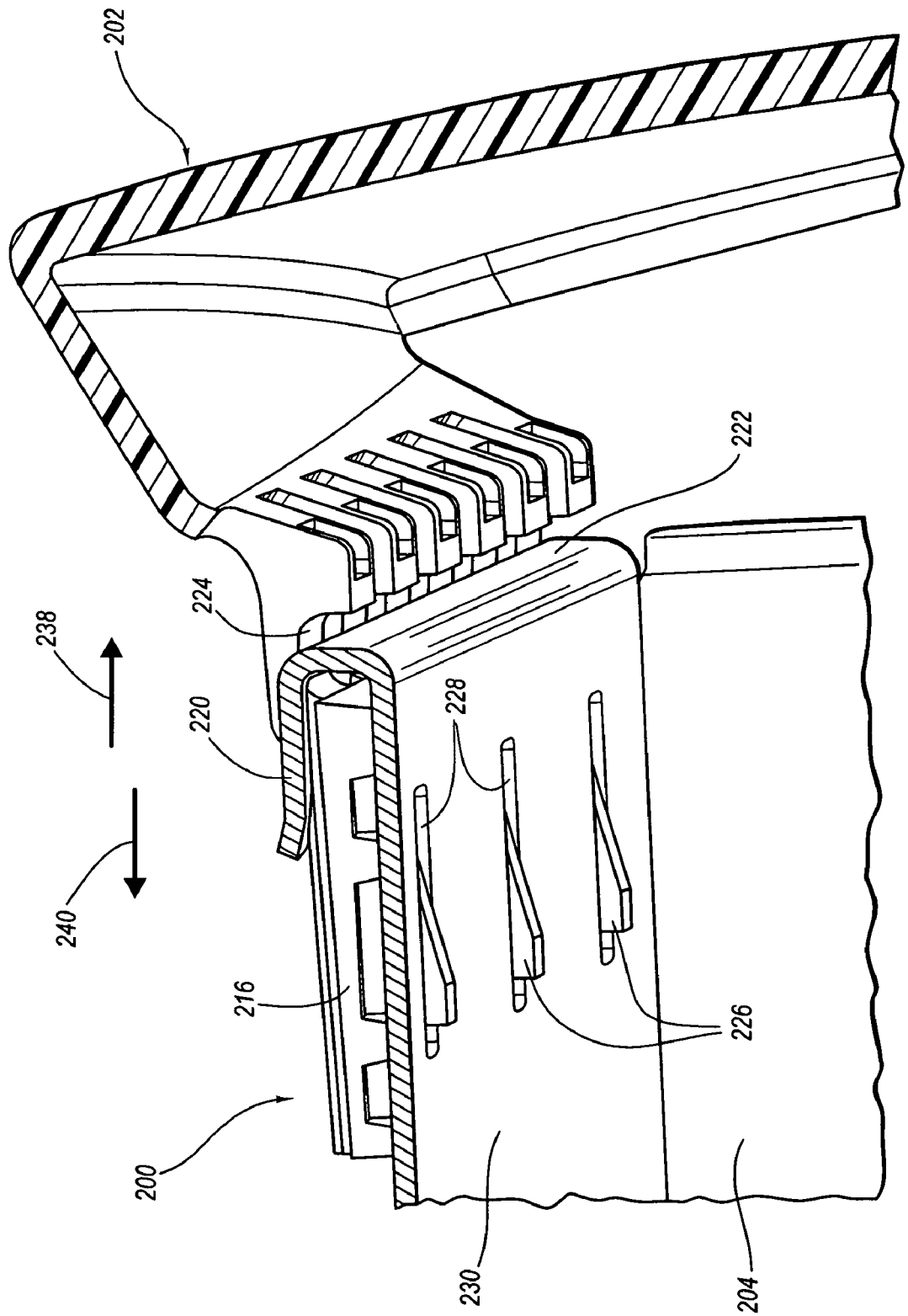
FIG. 7 is a partially cut-away cross sectional perspective view of the airbag cover of FIG. 2 coupled to an airbag module housing.

FIG. 7 represents the airbag module 200 of FIG. 2, shown from a partially cut-away cross sectional perspective view from underneath and inside the module housing 204. As mentioned previously, the hooks 220 extending from the side wall 230 of the housing 204 engage the cover 202 and limit separation movement of the cover 202 away from the housing 204 in a first direction 238. Furthermore, the locking tabs 226 extending from the interior side of the cover side wall 216 are disposed in corresponding windows 228 in the module housing 204. The locking tabs 226 limit compression movement of the cover 202 toward the housing 204 in a second direction 240. Additionally, flange 222 is disposed in channel 224 to permit a limited range of movement in the first and second directions 238, 240.

In order for the cover 202 to become detached from the module housing 204 after they are engaged, external force and additional tools may be required. For example, the locking tabs 226 may become disengaged with the housing windows 228 by lifting the corresponding portion of the cover side wall 216 upwards. At the same time, the housing flange 222 is disengaged from the cover channel 224 by lifting the corresponding portion of the cover side wall 216 upwards, while also concurrently disengaging the cover openings from the housing hooks 220.

As the cover locking tabs 226 are pulled away from the corresponding windows 228, this causes the channel 224 of the cover 202 to press itself more firmly into the housing flange 222 area. Consequently, an additional external opposing force may be required to concurrently lift the cover channel 224 portion away from the housing flange 222 while the locking tabs 226 are pulled away from the windows 228. In order to separate the cover 202 from the housing 204, the openings of the cover 202 are subsequently slid away from engagement with the housing hooks 220. As a result, deployment of an airbag through the cover 202 would typically not provide the opposing forces required to disengage the cover 202 from the housing 204.

The protrusions and hooks 220 and corresponding windows and openings 218 disclosed herein are examples of means for preventing separation of the cover away from the housing. Furthermore, the locking tabs 226 and corresponding windows 228 disclosed herein are examples of means for limiting compression movement of the cover toward the housing. Moreover, the flanges 222 and channels 224 disclosed are examples of floating means for permitting restricted movement of the cover toward and away from the housing when the cover is engaged with the housing.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. § 112 ¶6. The scope of the invention is therefore defined by the following claims.

The invention claimed is:

1. An airbag module cover, comprising:
   a top cover portion configured to cover an airbag; and
   a side portion configured to engage an airbag module housing, the side portion comprising:
   a plurality of tabs configured to engage corresponding windows in the airbag module housing,
   an opening configured to receive a protrusion on the airbag module housing; and
   a channel configured to receive a flange on the airbag module housing, wherein the channel allows the airbag module cover to float with respect to the airbag module housing.

2. The airbag module cover of claim 1, wherein the channel has a width greater than a width of the flange.

3. The airbag module cover of claim 2, wherein the width of the channel permits movement of the airbag module cover relative to the airbag module housing over a defined distance.

4. The airbag module cover of claim 1, wherein the tabs are ramped on one end.

5. The airbag module cover of claim 1, wherein the tabs extend inwardly toward a center portion of the airbag module cover.

6. The airbag module cover of claim 1, wherein the protrusion of the airbag module housing is a hook and the opening of the airbag module cover is configured to receive and engage the hook.

7. An airbag module, comprising:
   an airbag housing having a plurality of protrusions and a flange extending from the housing; and
   a cover coupled to the airbag housing, the cover having a plurality of openings in a wall thereof, the plurality of openings corresponding to and engageable with the plurality of protrusions extending from the housing, the cover further having a channel in the cover wall shaped to receive the flange extending from the housing, wherein the channel allows the cover to float with respect to the airbag housing,
   wherein the cover further comprises a plurality of tabs extending from the cover and the airbag housing further comprises a plurality of windows engaging the corresponding plurality of tabs on the cover.

8. The airbag module of claim 7, wherein the cover comprises a top portion and a side wall portion, the plurality of openings and the channel being disposed in the side wall portion.

9. The airbag module of claim 8, wherein the plurality of protrusions and the flange extend from the housing adjacent a top edge of the housing.

10. The airbag module of claim 9, wherein the flange extends outwardly and the channel is disposed on an internal side of the side wall portion of the cover.

11. The airbag module of claim 7, wherein the channel has a width greater than a width of the flange.

12. The airbag module of claim 11, wherein the width of the channel relative to the width of the flange permits movement of the cover relative to the airbag housing.

13. The airbag module of claim 7, wherein each of the plurality of tabs are ramped on one end to slidably engage each of the corresponding plurality of windows when the cover is coupled to the airbag housing.

14. The airbag module of claim 7, wherein the cover is coupled to the airbag housing such that an airbag is deployable through the cover.

15. The airbag module of claim 7, wherein each of the plurality of protrusions extending from the airbag housing is a hook that engages the plurality of openings in the cover.

16. An airbag assembly, comprising:
an airbag housing comprising a plurality of windows;
a cover engageable to the airbag housing, the cover comprising a plurality of tabs;
means for preventing separation of the cover away from the housing once the cover is engaged with the housing; and
floating means for permitting restricted movement of the cover toward and away from the housing when the cover is engaged with the housing, wherein the floating means allows the cover to float with respect to the airbag housing,
wherein the plurality of windows of the airbag housing are configured to engage the plurality of tabs of the cover so as to limit compression movement of the cover toward the housing when the cover is engaged with the housing.

17. The airbag assembly of claim 16, wherein the separation prevention means and the floating means each comprise separate structural components of the airbag assembly.

18. The airbag assembly of claim 17, wherein the separation prevention means and the floating means each individually comprise a first structural component of the cover that interacts with a second structural component of the airbag housing.

* * * * *